United States Patent
Liang

(10) Patent No.: US 8,115,452 B2
(45) Date of Patent: Feb. 14, 2012

(54) BICYCLE BATTERY CONNECTION SYSTEM CAPACLE OF CONNECTING DIFFERENT TYPES OF BATTERY

(75) Inventor: Charles Liang, Mioli (TW)

(73) Assignee: J.D Components Co., Ltd., Chang Hua Hsien (TW)

( * ) Notice: Subject to any disclaimer, the term of this patent is extended or adjusted under 35 U.S.C. 154(b) by 462 days.

(21) Appl. No.: 12/457,355

(22) Filed: Jun. 9, 2009

(65) Prior Publication Data

US 2010/0203369 A1    Aug. 12, 2010

(30) Foreign Application Priority Data

Feb. 6, 2009    (TW) ............................ 98201775 U

(51) Int. Cl.
*H02J 7/00* (2006.01)
(52) U.S. Cl. .................... 320/132; 320/106; 320/138
(58) Field of Classification Search .............. 320/132, 320/106, 138
See application file for complete search history.

(56) References Cited

U.S. PATENT DOCUMENTS

| | | | | | |
|---|---|---|---|---|---|
| 4,388,582 | A | * | 6/1983 | Saar et al. ...................... | 320/156 |
| 4,392,101 | A | * | 7/1983 | Saar et al. ...................... | 320/156 |
| 5,182,546 | A | * | 1/1993 | Shinbori et al. ............ | 340/636.1 |
| 5,352,966 | A | * | 10/1994 | Irons .............................. | 320/103 |

* cited by examiner

*Primary Examiner* — Reena Aurora
(74) *Attorney, Agent, or Firm* — Bacon & Thomas, PLLC

(57) ABSTRACT

A bicycle battery connection system includes a battery data determination circuit, a battery data processing circuit and an adapter. The battery data determination circuit is electrically connected to one of the first-type battery having an MCU and a second-type battery without an MCU through the adapter for enabling battery data of the connected battery to be processed by the battery data processing circuit and outputted as battery status for display on a display device in front of the user and for further battery output control. Thus, either a first-type battery or a second-type battery can be used and detected for automatic matching, and therefore the battery connection system allows a bicycle to use any of different types of batteries.

10 Claims, 4 Drawing Sheets

BICYCLE BATTERY CONNECTION SYSTEM CAPACLE OF CONNECTING DIFFERENT TYPES OF BATTERY

BACKGROUND OF THE INVENTION

1. Field of the Invention

The present invention relates to a battery connection system for use in an electric bicycle and more particularly, to a battery connection system capable of connecting different types of battery for an electric bicycle.

2. Description of the Related Art

Following fast development of battery technology, many different batteries such as nickel-cadmium battery, nickel-metal hydride (NiMH) battery, Li-ion battery and other solid batteries have been continuously developed. Commercial batteries are generally divided into two types, namely, the first-type batteries containing a micro control unit (MCU) therein and the second-type batteries without installation of the micro control unit. These first-type batteries and the second-type batteries have different power supply ability, different control designs and different dimensions to match different circuit designs. In consequence, the battery circuit design for electric bicycle is complicated. Nowadays, many people use bicycles as a personal transportation vehicle. Therefore, there is a big market demand for electric bicycle. Under this market demand, first-type/second-type battery option and peripheral techniques are important.

A first-type battery, for example, Li-ion battery can be discharged and charged repeatedly. Because of the advantage of high energy density, a first-type battery is very suitable for use in an electric bicycle. Further, the internal micro control unit (MCU) of a first-type battery allows integration of peripheral functions in a single chip. Further, the internal MCU of a first-type battery can cooperate with inter-integrated circuit (I2C) technique to provide an electric bicycle with a diversity of power supply. Therefore, using the first-type battery is the best choice for electric bicycle.

However, using a first-type battery in an electric bicycle has drawbacks as follows:

1. The cost of a first-type battery is high. An electric bicycle using a first-type battery will encounter the challenge of market acceptability.

2. The maintenance of a first-type battery is complicated. It is not economic to prepare a spare first-type battery for replacement.

A second-type battery is a traditional low-cost battery with weak electric energy and without any micro control unit built inside. Rechargeable NiMH battery is the most commonly seen second-type battery. A second-type battery for bicycle is normally packed in a battery box and installed in the bicycle frame beneath the rear luggage carrier or saddle. Further, a second-type batter is replaceable. However, a second-type battery has the drawbacks as follows:

1. The energy density (wh/kg) of a second-type battery is much lower than a first-type battery of same weight; the energy density (wh/l) of a second-type battery is much lower than a first-type battery of same volume. Low power supply density is the major drawback of a second-type battery.

2. A second-type battery has a short cycle lifetime, and the problem of self-discharging instability.

Regular electric bicycles are compatible to one type of battery only, i.e., they do not allow selective use of a first-type battery or a second-type battery.

Therefore, it is desirable to provide a bicycle battery connection system, which allows an electric bicycle to use one of a first-type battery having an MCU therein and a second-type battery without an MCU selectively.

SUMMARY OF THE INVENTION

The present invention has been accomplished under the circumstances in view. It is therefore one objective of the present invention to provide a battery connection system for an electric bicycle, which allows connection with one of a first-type battery having an MCU and a second-type battery without an MCU selectively.

To achieve this objective of the present invention, the battery connection system comprises a battery data determination circuit, a battery data processing circuit and an adapter. The battery data determination circuit is electrically connected to one of the first-type battery having an MCU and a second-type battery without an MCU through the adapter for enabling battery data of the connected battery to be processed by the battery data processing circuit and outputted as battery status for display on a display device in front of the user and for further battery output control.

Based on the aforesaid design, the invention allows optional use of a first-type battery or a second-type battery, well protecting the power supply circuit and avoiding battery damage due to any incompatibility. After detection of battery data, the invention automatically matches the installed battery, assuring battery compatibility.

The battery data determination circuit includes an inter-integrated circuit for communicating with the first-type battery for enabling the battery data determination circuit to obtain battery data of the first-type battery, and a voltage detection circuit for detecting analog voltage of the second-type battery for enabling the battery data determination circuit to determine battery data of the second-type battery. The battery data of the first-type battery includes battery capacity, current and voltage.

The battery data processing circuit determines battery status based on the battery data of the first-type battery or the battery data of the second-type battery and outputs the battery status to a display device for display. The display device may be an LED display or an LCD.

The adapter may be variously embodied. Further, the adapter can be made having a universal connector convenient for the connection of a battery in an electric bicycle at any selected location.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 4:
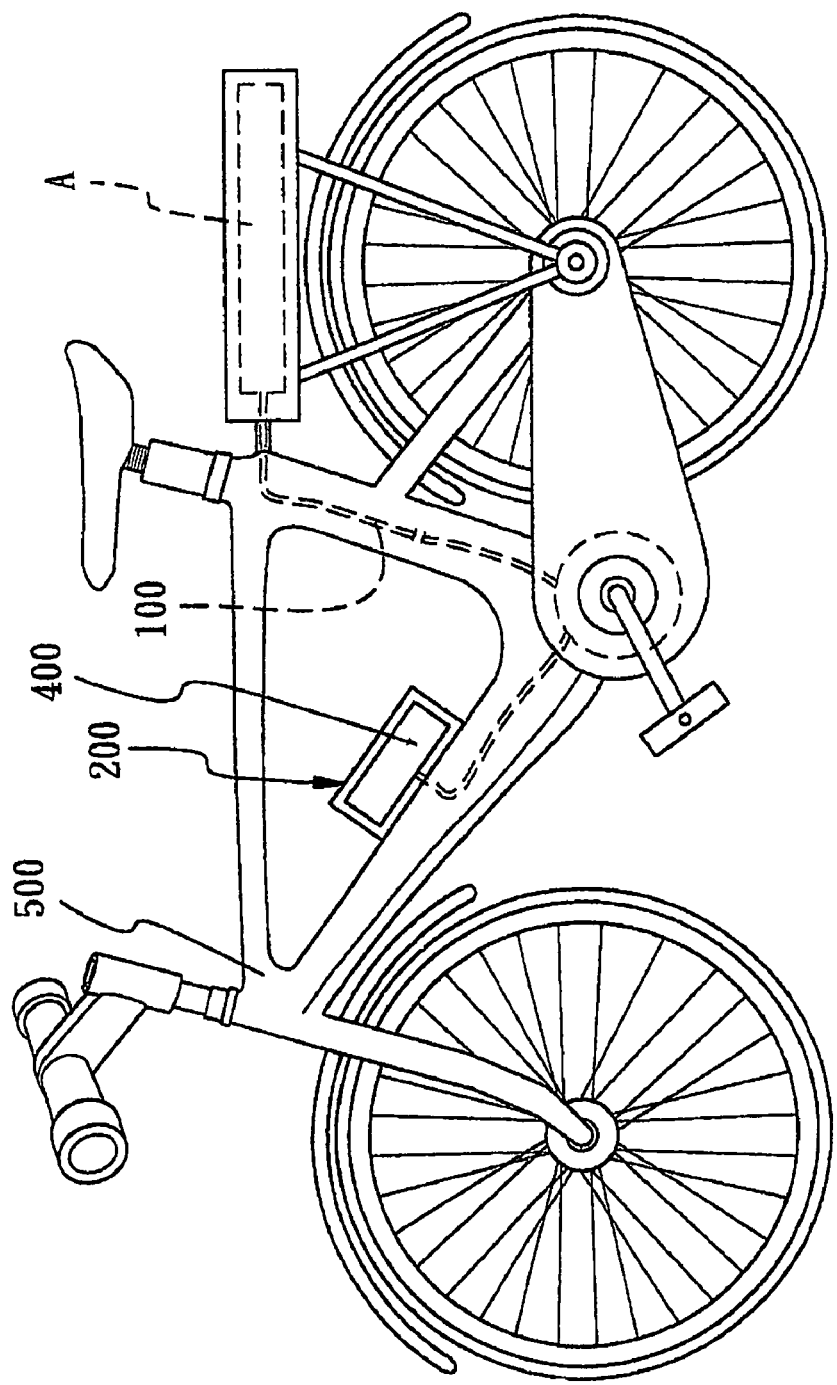
FIG. 4 is a schematic drawing showing that the bicycle battery connection system is installed in an electric bicycle.

Referring to FIGS. 1-4, the bicycle battery connection system in accordance with a preferred embodiment of the present invention comprises an adapter 100, a battery data determination circuit 200 and a battery data processing circuit 300. The bicycle battery connection system is adapted to be installed in an electric bicycle 500, as shown in FIG. 4.

The adapter 100 has a connection terminal 101 at each of two distal ends thereof. The connection terminal 101 at one end of the adapter 100 is connectable to a first-type battery A or second-type battery B such that the bicycle battery connection system can obtain the battery status of the first-type battery A or second-type battery B through the communication of the adapter 100. As shown in FIG. 4, the adapter 100 is mounted inside a frame of the electric bicycle 500.

The battery data determination circuit 200 is connected to the connection terminal 101 at the other end of the adapter 100. Further, the battery data determination circuit 200 comprises an inter-integrated circuit (I2C) 210 and a voltage detection circuit 220. The inter-integrated circuit 210 is adapted for communication with the first-type battery A such that the bicycle battery connection system can obtain the battery data of the first-type battery A through the communication between the I2C 210 and the internal inter-integrated circuit (I2C) A1 of the first-type battery A. The aforesaid battery data of the first-type battery A includes battery capacity, current, voltage and temperature. Further, when the bicycle battery connection system is connected with a second-type battery, the voltage detection circuit 220 detects analog voltage of the second-type battery B, thereby determining the battery data of the second-type battery B.

The battery data processing circuit 300 comprises a micro control unit (MCU) 301 and a display control circuit 302. By means of the inter-integrated circuit 210 of the battery data determination circuit 200 and the voltage detection circuit 220, the battery data processing circuit 300 obtains the battery data from the first-type battery A or second-type battery B, i.e., the battery data processing circuit 300 is compatible to the first-type battery A as well as the second-type battery B. Further, the battery data processing circuit 300 sends out signal to display battery status by means of the display control circuit 302 for further power output control.

Figure 1:
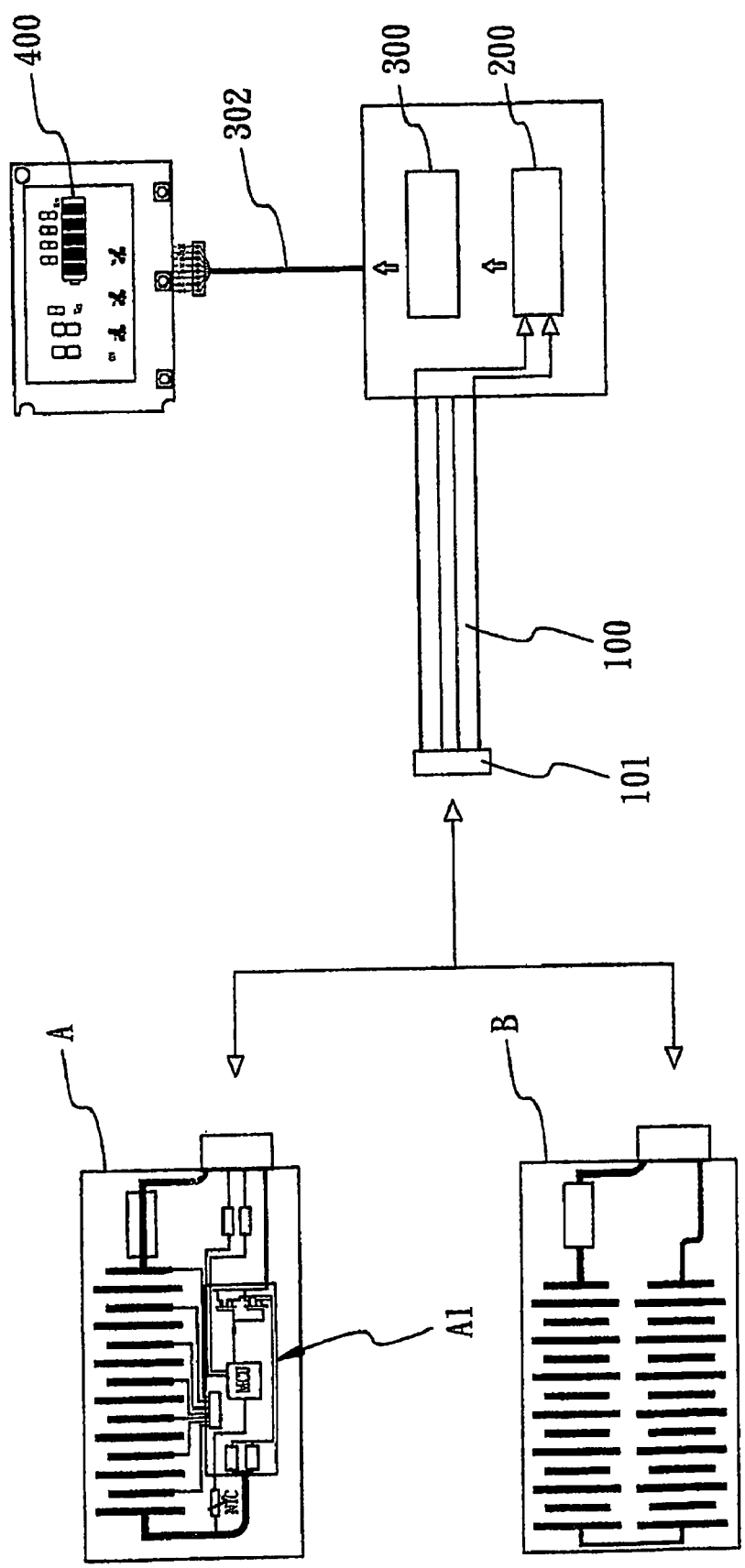
FIG. 1 is a block diagram of a bicycle battery connection system in accordance with a preferred embodiment of the present invention.
Figure 2:
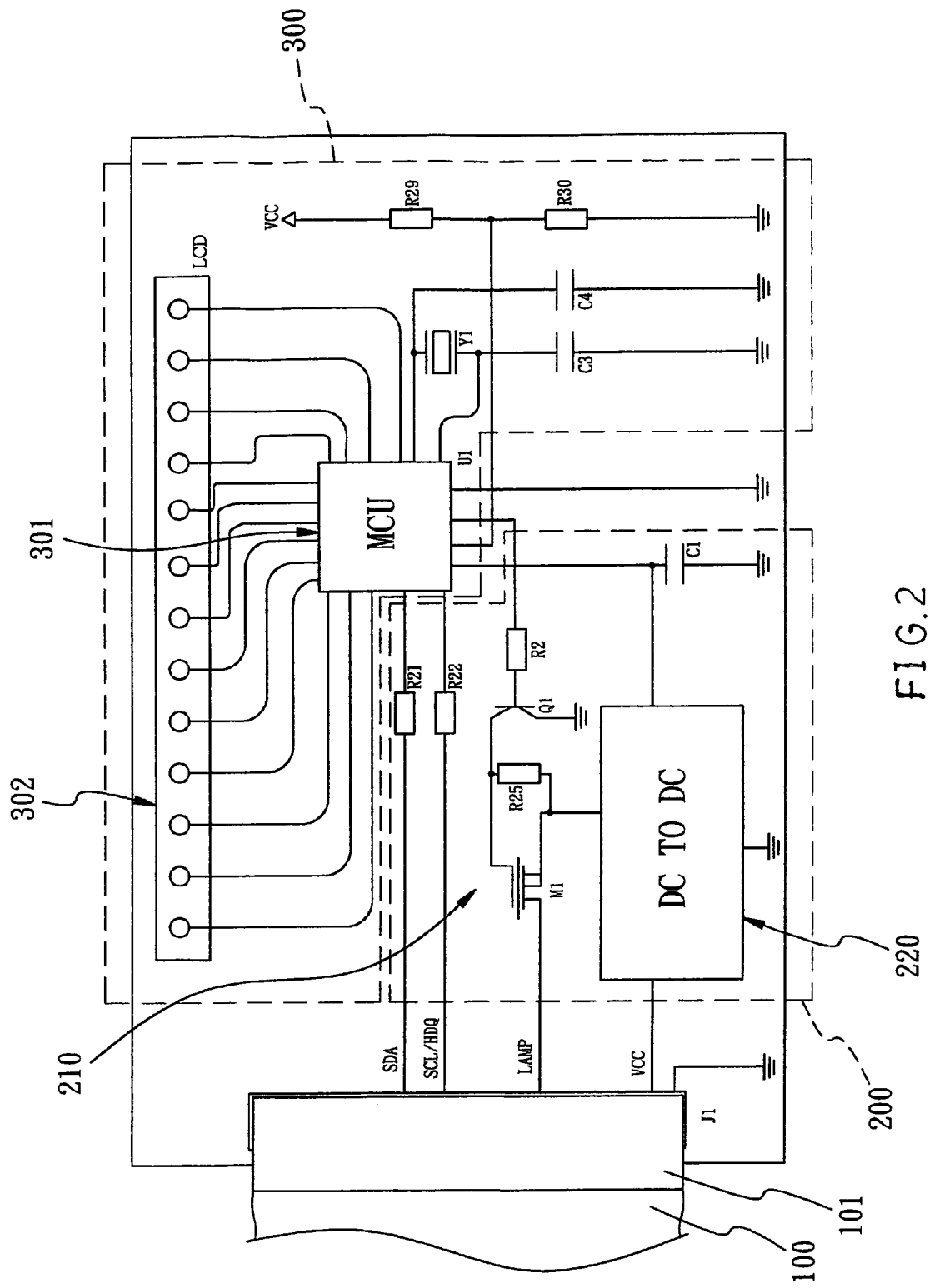
FIG. 2 is a circuit diagram of a bicycle battery data processing circuit of the battery connection system in accordance with the preferred embodiment of the present invention.
Figure 3:
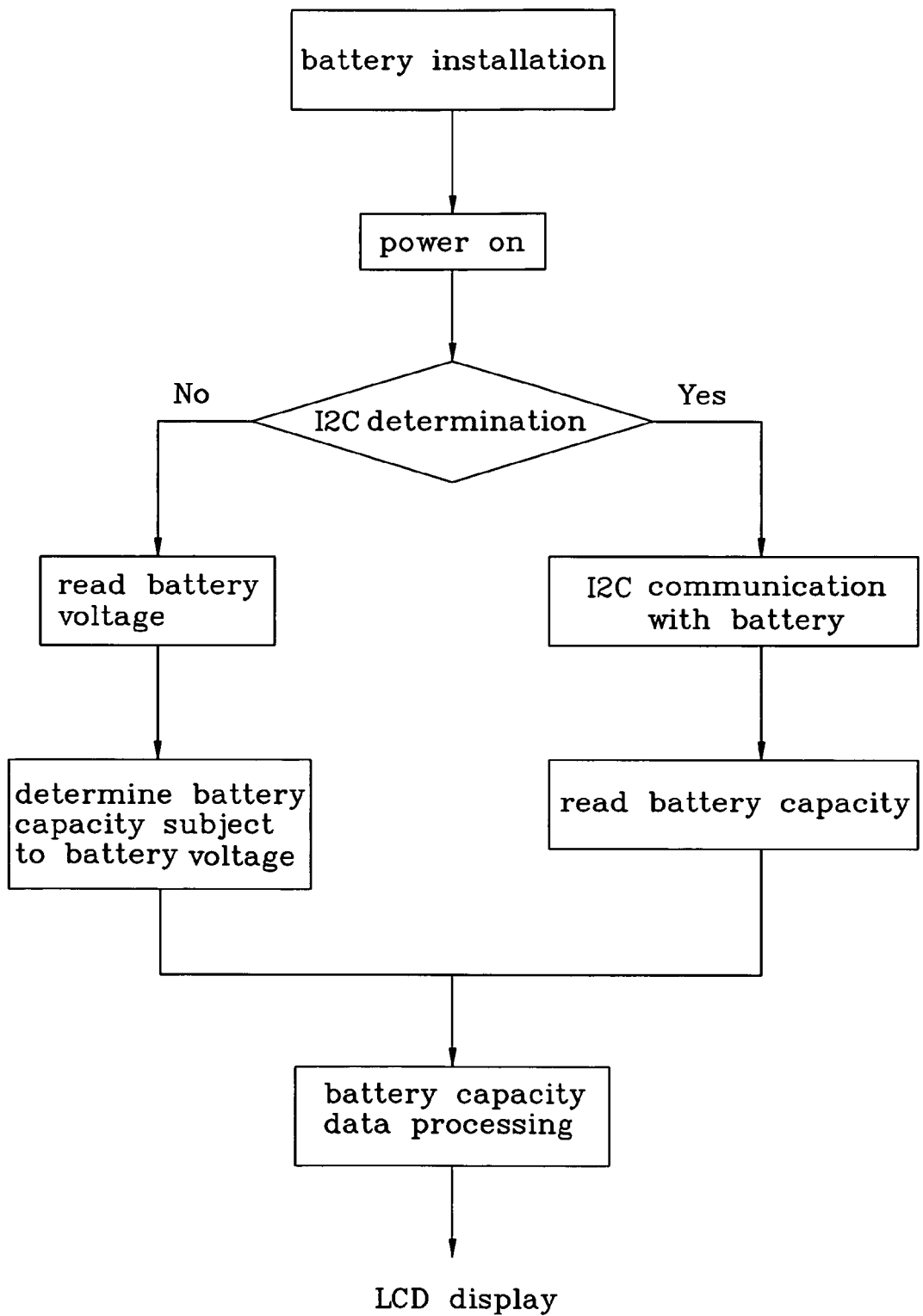
FIG. 3 is a diagram showing how the bicycle battery connection system of the present invention works.

By means of the display control circuit 302, the battery data processing circuit 300 sends out signal carrying the battery status which is determined subject to the battery data of the first-type or second type battery to a predetermined display device 400 for the display of the battery status for further power output control. According to the present preferred embodiment, as shown in FIG. 1, the display device 400 is an LED display. However, any other display, such as liquid crystal display, may be employed without departing from the spirit of the present invention.

Referring to FIGS. 3 and 4 again, the operation of the battery connection system and how it works are illustrative as the following steps.

1. Battery installation: Connect a first-type battery A or a second-type battery B to the adapter 100.

2. Start-up: Start up the bicycle battery connection system of the present invention.

3. I2C determination: Use the battery data determination circuit 200 to determine whether or not the batter connected thereto is a first-type battery A having the inter-integrated circuit.

4. If the determination shows that a first-type battery is connected with the bicycle battery connection system, the inter-integrated circuit 210 starts communication with the first-type battery A to obtain the battery data through the inter-integrated circuit 21 of the first-type battery A, including battery capacity, current, voltage and temperature.

5. If the determination is negative, the voltage detection circuit 220 detects analog voltage of the second-type battery B, thereby determining the battery data of the second-type battery B.

6. The battery data processing circuit 300 obtains the battery data of the first-type battery A via the inter-integrated circuit 210 of the battery data determination circuit 200 or the battery data of the second-type battery B via the voltage detection circuit 220, and sends out signal containing the battery status of first-type or second-type battery after processing the obtained battery data through the display control circuit 302 to the LED display 400 for display.

By means of the aforesaid design, the invention can selectively connect a first-type battery having an MCU or a second-type battery without an MCU, and automatically detect the battery data of the connected battery for smooth running. Therefore, the invention allows use of different types of battery in an electric bicycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bicycle battery connection system for selectively connecting one of a first-type battery having a micro control unit and a second-type battery without a micro control unit, the battery connection system comprising:

an adapter mountable to a bicycle frame and provided with a first connection terminal at one end thereof for connecting one of the first-type battery and the second-type battery, and a second connection terminal at an opposite end thereof;

a battery data determination circuit electrically connected with said second connection terminal of said adapter and provided with an inter-integrated circuit for communicating with the first-type battery for enabling the battery data determination circuit to obtain battery data of the first-type battery, and a voltage detection circuit for detecting analog voltage of the second-type battery for enabling the battery data determination circuit to determine battery data of the second-type battery; and a battery data processing circuit electrically connected with the inter-integrated circuit and the voltage detection circuit of said battery data determination circuit for determining battery status based on the battery data of the first-type battery or the battery data of the second-type battery and outputting the battery status for display.

2. The bicycle battery connection system as claimed in claim 1, wherein the battery data of the first-type battery comprises battery capacity, current, voltage and temperature.

3. The bicycle battery connection system as claimed in claim 1, wherein said battery data processing circuit further comprises a display control circuit for transmitting signal for displaying the battery data.

4. The bicycle battery connection system as claimed in claim 3, further comprising a display device mountable to the bicycle frame and controllable by said display control circuit of said battery data processing circuit to display the battery status.

5. The bicycle battery connection system as claimed in claim 4, wherein said display device is an LED display or a liquid crystal display.

6. The bicycle battery connection system as claimed in claim 5, wherein said second-type battery is a rechargeable nickel-metal hydride battery.

7. The bicycle battery connection system as claimed in claim 1, wherein said first-type battery is a Li-ion battery.

8. A bicycle battery connection system to be installed in a bicycle frame and selectively connectable with one of a first-type battery having a micro control unit and a second-type battery without a micro control unit, the battery connection system comprising:

an adapter selectively connectable with the one of the first-type battery and the second-type battery;

a battery data determination circuit electrically connected with said adapter and provided with an inter-integrated circuit for communicating with the first-type battery for enabling the battery data determination circuit to obtain battery data of the first-type battery, and a voltage detection circuit for detecting voltage of the second-type battery for enabling the battery data determination circuit to determine battery data of the second-type battery;

a battery data processing circuit electrically connected with the inter-integrated circuit and the voltage detection circuit of said battery data determination circuit for determining battery status based on the battery data of the first-type battery or the battery data of the second-type battery and outputting signal for displaying the battery status, and a display device electrically connected with said battery data processing circuit for receiving the signal transmitted from said battery data processing circuit for displaying the battery status of the first-type battery or the second-type battery.

9. The bicycle battery connection system as claimed in claim 8, wherein said display device is an LED display or a liquid crystal display.

10. The bicycle battery connection system as claimed in claim 8, wherein the first-type battery is a Li-ion battery and the second-type battery is a rechargeable nickel-metal hydride battery.

* * * * *